(12) United States Patent
Kannan (10) Patent No.: US 11,711,465 B2
(45) Date of Patent: Jul. 25, 2023

(54) METHOD AND APPARATUS FOR PROVIDING ASSISTANCE TO CALLING CUSTOMERS

(71) Applicant: [24]7.ai, Inc., Campbell, CA (US)

(72) Inventor: Pallipuram V. Kannan, Los Gatos, CA (US)

(73) Assignee: [24]7.ai, Inc., Campbell, CA (US)

( * ) Notice: Subject to any disclaimer, the term of this patent is extended or adjusted under 35 U.S.C. 154(b) by 0 days.

(21) Appl. No.: 16/996,649

(22) Filed: Aug. 18, 2020

(65) Prior Publication Data

US 2021/0058512 A1 Feb. 25, 2021

Related U.S. Application Data

(60) Provisional application No. 62/890,239, filed on Aug. 22, 2019.

(51) Int. Cl.
| | |
|---|---|
| *H04M 3/51* | (2006.01) |
| *H04M 3/487* | (2006.01) |
| *H04M 3/428* | (2006.01) |
| *H04M 3/42* | (2006.01) |

(52) U.S. Cl.
CPC ....... *H04M 3/4872* (2013.01); *H04M 3/4283* (2013.01); *H04M 3/42144* (2013.01); *H04M 3/5175* (2013.01); *H04M 3/5191* (2013.01)

(58) Field of Classification Search
CPC .......... H04M 3/42144; H04M 3/4283; H04M 3/4872; H04M 3/5141; H04M 3/5175; H04M 3/5191; H04M 7/0042
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05,
(Continued)

(56) References Cited

U.S. PATENT DOCUMENTS

| | | | | |
|---|---|---|---|---|
| 5,479,487 | A * | 12/1995 | Hammond | ............. H04M 3/51 |
| | | | | 379/266.07 |
| 7,487,095 | B2 * | 2/2009 | Hill | ..................... G10L 15/1822 |
| | | | | 704/275 |

(Continued)

FOREIGN PATENT DOCUMENTS

WO WO 2014/145149 9/2014

*Primary Examiner* — Nafiz E Hoque
(74) *Attorney, Agent, or Firm* — Perkins Coie LLP; Michael Glenn (57) ABSTRACT

A method and apparatus for providing assistance to customers seeking assistance from agents of an enterprise is disclosed. The method includes receiving a signal indicating the caller's wish to speak with a live agent associated with the enterprise to seek the assistance from the live agent. In response to a receipt of the signal, it is determined whether at least one live agent from among a plurality of live agents associated with the enterprise is available for a voice interaction with the caller. Subsequent to determining that no live agent from among the plurality of live agents is currently available for the voice interaction with the caller, the caller is diverted to an asynchronous messaging channel. A textual messaging-based interaction is facilitated between a messaging agent and the caller on the asynchronous messaging channel to provide the assistance to the caller.

13 Claims, 7 Drawing Sheets

(58) Field of Classification Search
USPC ............ 379/266.06, 266.07, 266.08, 266.09, 379/266.1
See application file for complete search history.

(56) References Cited

U.S. PATENT DOCUMENTS

| | | | | |
|---|---|---|---|---|
| 7,606,714 B2* | 10/2009 | Williams | ............... | H04M 3/493 704/275 |
| 7,647,228 B2* | 1/2010 | Silvera | ................... | G10L 15/22 704/275 |
| 7,925,243 B2* | 4/2011 | McGary | ............... | H04M 3/4931 455/414.1 |
| 8,000,973 B2* | 8/2011 | Williams | ............... | G10L 13/027 704/275 |
| 8,238,951 B2* | 8/2012 | McGary | ............ | H04M 15/8278 455/466 |
| 8,767,948 B1* | 7/2014 | Riahi | .................. | H04M 3/5175 379/266.01 |
| 9,094,513 B2* | 7/2015 | Brimshan | ........... | H04M 3/5158 |
| 9,559,993 B2* | 1/2017 | Palakovich | ............. | H04L 51/02 |
| 9,866,693 B2* | 1/2018 | Tamblyn | ............... | H04M 3/5191 |
| 9,912,810 B2* | 3/2018 | Segre | ................... | H04L 65/1093 |
| 10,038,787 B2* | 7/2018 | Tamblyn | ............... | H04M 3/5166 |
| 10,127,513 B1* | 11/2018 | Kulkarni | ............. | G06Q 30/016 |
| 10,498,904 B1* | 12/2019 | Sandler | ............... | H04M 3/4936 |
| 11,010,704 B2* | 5/2021 | Kulkarni | .................. | H04L 51/02 |
| 11,082,456 B2* | 8/2021 | Singman | ............... | H04M 3/5191 |
| 11,436,618 B2* | 9/2022 | Kannan | ............... | H04M 3/5231 |
| 2001/0054064 A1* | 12/2001 | Kannan | .................. | G06Q 30/02 709/218 |
| 2004/0162724 A1* | 8/2004 | Hill | ..................... | G10L 15/1822 704/231 |
| 2005/0105712 A1* | 5/2005 | Williams | ............... | G10L 13/027 704/275 |
| 2005/0111653 A1* | 5/2005 | Joyce | .................... | H04M 3/523 379/265.09 |
| 2006/0045241 A1* | 3/2006 | Bushey | ............... | H04M 3/5166 379/88.01 |
| 2006/0080107 A1* | 4/2006 | Hill | ........................ | G10L 15/22 704/275 |
| 2006/0080130 A1* | 4/2006 | Choksi | ................ | G06Q 30/016 709/206 |
| 2007/0100625 A1* | 5/2007 | Silvera | .................... | G10L 15/22 704/E15.04 |
| 2007/0237318 A1* | 10/2007 | McGary | ............ | H04M 15/8228 379/114.15 |
| 2009/0228264 A1* | 9/2009 | Williams | ............... | H04M 3/493 704/9 |
| 2009/0245500 A1* | 10/2009 | Wampler | ............... | H04M 7/006 379/265.09 |
| 2010/0162101 A1* | 6/2010 | Anisimov | ........... | H04M 3/5183 715/239 |
| 2011/0051918 A1* | 3/2011 | Fan | ..................... | H04M 3/5166 379/211.02 |
| 2012/0003998 A1* | 1/2012 | McGary | ............ | H04M 15/8278 455/466 |
| 2012/0329489 A1* | 12/2012 | McGary | ............ | H04M 15/8278 455/466 |
| 2013/0094647 A1 | 4/2013 | Mauro et al. | | |
| 2014/0044243 A1* | 2/2014 | Monegan | ............ | H04M 3/5166 379/88.01 |
| 2014/0314225 A1* | 10/2014 | Riahi | .................. | H04M 3/5191 379/265.09 |
| 2015/0055773 A1* | 2/2015 | Brimshan | ............ | H04M 3/5158 379/266.01 |
| 2016/0065738 A1* | 3/2016 | Schwartz | ............. | G06Q 30/016 379/265.03 |
| 2016/0099892 A1* | 4/2016 | Palakovich | ............. | H04L 51/04 709/206 |
| 2016/0308799 A1* | 10/2016 | Schubert | .................. | H04L 67/22 |
| 2017/0054852 A1* | 2/2017 | McGreevy | .......... | H04M 3/5235 |
| 2017/0324866 A1* | 11/2017 | Segre | ....................... | H04L 51/02 |
| 2017/0324867 A1* | 11/2017 | Tamblyn | ............... | H04M 3/5191 |
| 2017/0324868 A1* | 11/2017 | Tamblyn | ............... | H04M 7/0045 |
| 2018/0315000 A1* | 11/2018 | Kulkarni | .......... | G06Q 10/06395 |
| 2019/0058740 A1* | 2/2019 | Singman | ............... | H04M 3/5166 |
| 2019/0220794 A1* | 7/2019 | Kulkarni | ............... | H04W 88/16 |
| 2020/0014642 A1* | 1/2020 | Sidi | ..................... | H04M 3/5141 |
| 2020/0329144 A1* | 10/2020 | Morgan | ................... | H04L 51/02 |
| 2021/0042818 A1* | 2/2021 | Becker | ..................... | G06F 21/31 |
| 2021/0058512 A1* | 2/2021 | Kannan | ............... | H04M 3/5175 |

\* cited by examiner

METHOD AND APPARATUS FOR PROVIDING ASSISTANCE TO CALLING CUSTOMERS

CROSS REFERENCE TO RELATED APPLICATIONS

This application claims priority to U.S. provisional patent application 62/890,239 filed on Aug. 22, 2019, which is incorporated herein in its entirety by this reference thereto.

TECHNICAL FIELD

The present technology generally relates to interactions between customers and agents of an enterprise, and more particularly to a method and apparatus for providing assistance to calling customers.

BACKGROUND

Enterprises may engage with existing and/or potential users of enterprise offerings to draw their attention towards a product or a service, to provide information about an event of interest, to offer incentives and discounts, to solicit feedback, to provide billing related information etc. The existing and/or potential users of enterprise offerings are hereinafter collectively referred to as 'customers' of the enterprise. Just as the enterprises may engage with their customers, similarly, the customers may also initiate interactions with the enterprises to enquire about products/ services of interest, to resolve concerns, to make payments, to lodge complaints etc. The interactions between the enterprises and their customers may be conducted over a plurality of interaction channels, such as a Web channel, a voice channel, a chat channel, an Interactive Voice Response (IVR) channel, a social media channel, a native mobile application channel, and the like.

In an illustrative example, a customer may wish to interact with a customer support representative, also referred to herein as an agent. The customer may initiate a voice call to the customer support center to talk to an agent. However, many times, a human agent may not be available for interaction as all the human agents deployed by the enterprise may be engaged in serving other customers. In some cases, the customer may have to wait indefinitely to connect to an agent and resolve the customer's concern. To avoid lengthy waiting time for a calling customer, the call may be directed to an automated/virtual agent, such as for example, the IVR system to provide the desired assistance to the customer. In some instances, the assistance offered by the IVR system may be of limited help and the calling customer may still have to wait to speak with a human agent. Waiting for the interaction with a human agent to commence can be very frustrating for the customer. The customer on account of having to wait for a long time may abandon the interaction perhaps never to return, thereby leading to a loss of business for the enterprise.

SUMMARY

In an embodiment of the invention, a computer-implemented method for providing assistance to a caller is disclosed. The method receives a signal indicating the caller's wish to speak with a live agent associated with an enterprise to seek the assistance from the live agent. In response to a receipt of the signal, the method determines by the processor, whether at least one live agent from among a plurality of live agents associated with the enterprise is available for a voice interaction with the caller. Subsequent to determining that no live agent from among the plurality of live agents is currently available for the voice interaction with the caller, the method diverts the caller to an asynchronous messaging channel by the processor. A textual messaging-based interaction is facilitated between a messaging agent and the caller on the asynchronous messaging channel to provide the assistance to the caller.

In an embodiment of the invention, an apparatus for providing assistance to a caller is disclosed. The apparatus includes a processor and a memory. The memory stores instructions. The processor is configured to execute the instructions and thereby cause the apparatus to receive a signal indicating the caller's wish to speak with a live agent associated with an enterprise to seek the assistance from the live agent. In response to a receipt of the signal, the apparatus determines whether at least one live agent from among a plurality of live agents associated with the enterprise is available for a voice interaction with the caller. Subsequent to determining that no live agent from among the plurality of live agents is currently available for the voice interaction with the caller, the caller is diverted to an asynchronous messaging channel. A textual messaging-based interaction is facilitated between a messaging agent and the caller on the asynchronous messaging channel to provide the assistance to the caller.

In an embodiment of the invention, another computer-implemented method for providing assistance to a caller is disclosed. The method receives a signal indicating the caller's wish to speak with a live agent associated with an enterprise to seek the assistance from the live agent. In response to a receipt of the signal, the method determines by the processor, whether at least one live agent from among a plurality of live agents associated with the enterprise is available for a voice interaction with the caller. Subsequent to determining that no live agent from among the plurality of live agents is currently available for the voice interaction with the caller, the method identifies by the processor, at least one device which is accessible to the caller and which supports textual messaging-based interaction. In reply to the receipt of the signal, the method provides by the processor, a response configured to seek permission from the caller to divert the caller to an asynchronous messaging channel. The method diverts, by the processor, the caller to the asynchronous messaging channel on a device from among the identified at least one device subsequent to a receipt of the permission from the caller. The textual messaging-based interaction is facilitated between a messaging agent and the caller on the asynchronous messaging channel to provide the assistance to the caller.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
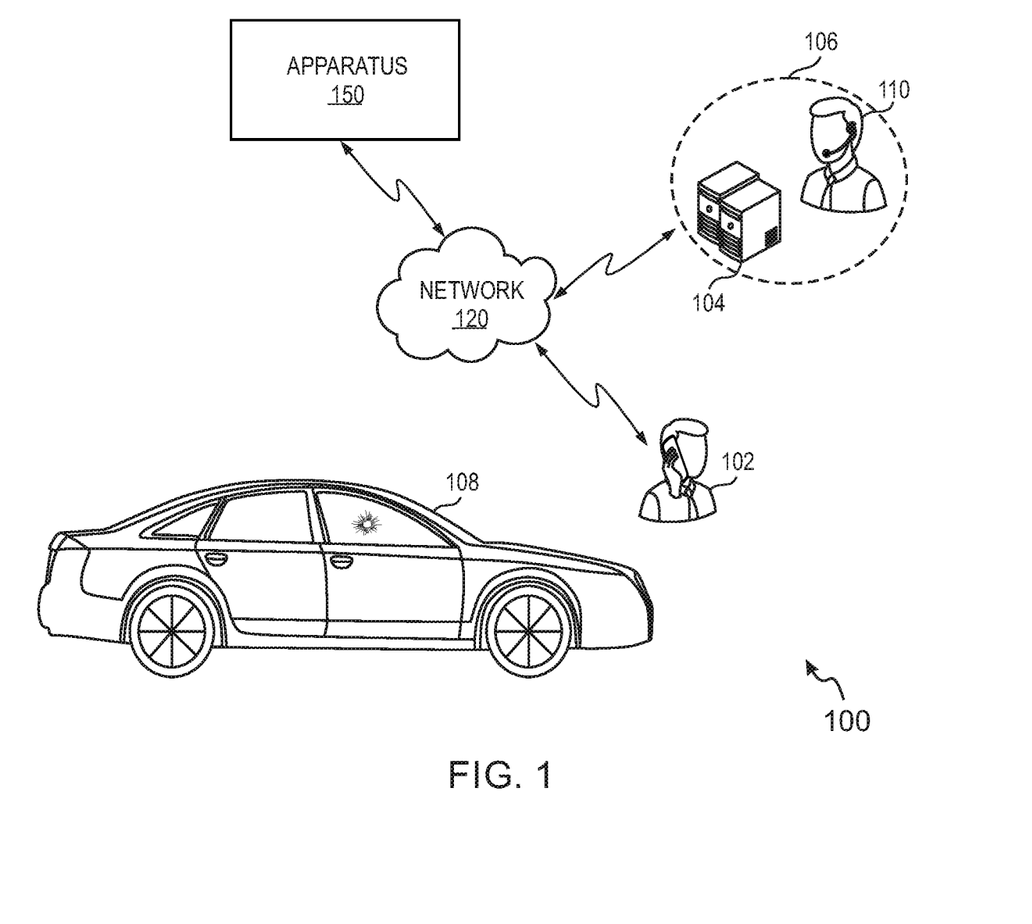
FIG. 1 is a representation showing a calling customer engaged in a voice interaction with an Interactive Voice Response (IVR) system associated with an enterprise, in accordance with an embodiment of the invention.

FIG. 1 is a representation 100 showing a calling customer 102 engaged in a voice interaction with an Interactive Voice Response System (IVRS) 104 associated with an enterprise, in accordance with an embodiment of the invention. The calling customer 102 is hereinafter referred to as a caller 102. The caller 102 may be an existing or a potential user of products, service or information offered by an enterprise (not shown in FIG. 1). The term 'enterprise' as used throughout the description may refer to a corporation, an institution, a small/medium sized company or even a brick and mortar entity. For example, the enterprise may be a banking enterprise, an educational institution, a financial trading enterprise, an aviation company, a consumer goods enterprise, an insurance company, a telecommunication enterprise or any such public or private sector enterprise.

The enterprise, like most enterprises nowadays, may offer customer service/customer support in form of a plurality of live agents and automated agents, who are trained to engage in interactions with the customers of the enterprise to resolve the customer queries and, in general, provide any desired assistance to the customers. The term 'live agent' as used herein implies a human agent, who is deployed at a customer service center or a customer support center, and who is trained to engage in voice interactions with enterprise customers to provide desired assistance to the customers. It is noted that for purposes of the description, the term 'customer service center' or 'customer support center' implies a facility, in which a plurality of live agents, a plurality of automated agents and several self-serve systems are deployed for providing assistance to the customers. Such a facility is hereinafter collectively referred to as a 'customer support center'. An example customer support center is depicted in the representation 100 as a customer support center 106. The customer support center 106 is exemplarily depicted to include only one IVRS in form of the IVRS 104 and one live agent 110 for illustration purposes. It is noted that the customer support center 106 may include a plurality of IVRS, a plurality of live agents, a plurality of automated/ virtual agents such as chatbots, and a plurality of self-serve systems.

In an illustrative example, the caller 102 may need assistance in filing an insurance claim for a broken windshield of a caller's car 108. The caller 102 may place a call to a helpline number associated with the customer support center 106 provided by the enterprise to seek assistance on filing of the insurance claim. The enterprise in such a case corresponds to an insurance company with which the caller's car 108 is insured.

Usually, in such scenarios, the caller 102 may have to endure a waiting period as the live agents deployed at the customer support center 106 may be busy in handling other customers. To avoid lengthy waiting time for the caller 102, the voice call may be directed to the IVRS 104 to provide the desired assistance to the caller 102. In some instances, the assistance offered by the IVRS 104 may be of limited help and the caller 102 may still have to wait to speak with a live agent, such as the live agent 110. Waiting for the interaction with the live agent 110 to commence can be very frustrating for the caller 102. The caller 102 on account of having to wait for a long time may abandon the interaction perhaps never to return, thereby leading to a loss of business for the enterprise.

To avoid such scenarios, in at least one example embodiment, the voice call placed by the caller 102 may be received by an apparatus 150 on account of the apparatus 150 being in operative communication with the customer support center 106. More specifically, the apparatus 150 may be in operative communication with server(s) hosting the enterprise website, one or more systems such as IVRS, and agent devices deployed at the customer support center 106. The communication between the apparatus 150 and the deployments at the customer support center 106 may be conducted over a communication network, such as a network 120. The network 120 may be embodied as a wired communication network (for example, Ethernet, local area network (LAN), etc.), a wireless communication network (for example, a cellular network, a wireless LAN, etc.) or a combination of wired communication networks and wireless communication networks (for example, the Internet). The apparatus 150 is configured to keep such callers engaged and avoid abandonment of interactions or unpleasant interaction experiences for the callers. The assistance provided by the apparatus 150 to the calling customers (i.e. the callers) is further explained with reference to FIG. 2.

Figure 2:
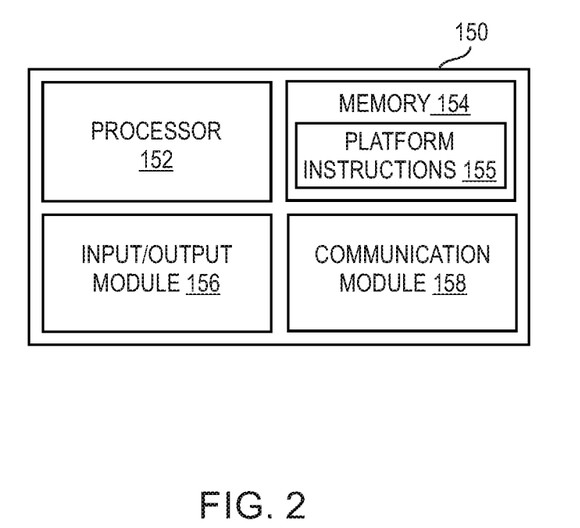
FIG. 2 is a block diagram of an apparatus configured to provide assistance to calling customers, in accordance with an embodiment of the invention.

FIG. 2 is a block diagram of the apparatus 150 of FIG. 1 configured to provide assistance to calling customers, in accordance with an example embodiment. The apparatus 150 is configured to provide assistance to calling customers (i.e. the callers). In one embodiment, the apparatus 150 is embodied as an interaction platform with one or more components of the apparatus 150 implemented as a set of software layers on top of hardware systems. In an illustrative example, the interaction platform may communicate over the network 120 (shown in FIG. 1) with a Web server deployed at the customer support center 106 to receive information related to agent-caller interactions in an on-going manner in almost real-time. In another illustrative example, the interaction platform may be in operative communication with servers associated with enterprise interaction channels, such as a server hosting an enterprise website to receive information related to customer activity on the enterprise website in almost real-time.

The apparatus 150 includes at least one processor, such as a processor 152 and a memory 154. It is noted that although the apparatus 150 is depicted to include only one processor, the apparatus 150 may include more number of processors therein. In one embodiment, the memory 154 is capable of storing machine executable instructions, referred to herein as platform instructions 155. Further, the processor 152 is capable of executing the platform instructions 155. In an embodiment, the processor 152 may be embodied as a multi-core processor, a single core processor, or a combination of one or more multi-core processors and one or more single core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the apparatus 150 includes a database (not shown in FIG. 2) configured to store information related to each interaction between callers and agents of an enterprise. It is noted that the interactions may include multimodal interactions, i.e. the interactions involving multiple interaction channels and multiple caller devices. Such stored interaction information serves to facilitate a passing of context during diverted interactions as will be explained later. In some embodiments, the stored information related to the interactions may include transcripts of conversations, IVRS option selections, agent notes, caller device preferences, issue resolution status, and the like. In addition to the stored interaction information, the database is further configured to store data such as, but not limited to, a registry of live agents assigned for voice interactions with the callers, a registry of human agents assigned for messaging interactions with enterprise customers, a registry of standard and specialized virtual agents (VAs), a domain specialization of each live/automated agent, and the like. The database may also store digital content capable of being displayed on the enterprise interaction channels such as for example information snippets, banner advertisements and widgets offering agent support among other content related to promotional offers, discount coupons etc.

In an embodiment, the database is any computer-operated hardware suitable for storing and/or retrieving data. The database may include multiple storage units such as hard disks and/or solid-state disks in a redundant array of inexpensive disks (RAID) configuration. In at least some embodiments, the database may be integrated within the apparatus 150. For example, the apparatus 150 may include one or more hard disk drives as the database. In other embodiments, the database is not included within the apparatus. For example, the database may be embodied as a storage area network (SAN) and/or a network attached storage (NAS) system. In such a scenario, the database may be accessed by the apparatus 150 using a storage interface. The storage interface is any component capable of providing the processor 152 with access to the database. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 with access to the database.

The apparatus 150 also includes an input/output module 156 (hereinafter referred to as an 'I/O module 156') and at least one communication module such as a communication module 158. The I/O module 156 includes mechanisms configured to receive inputs from and provide outputs to an operator of the apparatus 150. The term 'operator of the apparatus 150' as used herein refers to any individual or groups of individuals assigned with operating the apparatus 150 for providing interaction assistance to customers (for example, calling customers) of the enterprise. In an illustrative example, an enterprise may employ several data scientists, Machine Learning (ML) and/or Artificial Intelligence (AI) analysts, Information Technology (IT) professionals, scientists and researchers for configuring and operating the apparatus 150 embodied as an interaction platform. In an illustrative example, the I/O module 156 may enable the operator of the apparatus 150 to configure scripts to manage interactions across devices and interaction channels. In another illustrative example, the I/O module 156 may enable the operator of the apparatus 150 to feed/input information related to agents, such as agent domain specialization for instance, to enable routing of interaction requests from callers to appropriate agents deployed at the customer support center 106. To provide such inputs and view corresponding outputs, the I/O module 156 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 152 may include I/O circuitry (not shown in FIG. 2) configured to control at least some functions of one or more elements of the I/O module 156, such as, for example, a speaker, a microphone, a display, and/or the like. The processor 152 and/or the I/O circuitry may be configured to control one or more functions of the I/O module 156 through computer program instructions, for example, software and/or firmware, stored on a memory, for example, the memory 154, and/or the like, accessible to the processor 152.

The communication module 158 is configured to facilitate communication between the apparatus 150 and one or more remote entities over a communication network, such as the network 120 shown in FIG. 1. For example, the communication module 158 may enable communication between the apparatus 150 and customer devices, agent devices and/or IVRS deployed at the customer support center. In an illustrative example, the communication module 158 receives information related to interactions between callers and agents being conducted using various interaction channels, in real-time and provides the information to the processor 152.

In one embodiment, the processor 152 is configured to receive a signal indicating a customer's wish to speak with a live agent associated with an enterprise. For example, the customer (hereinafter referred to as a caller) may place a call to a helpline number provided by the enterprise to seek assistance from a live agent available at a customer support center of the enterprise. The call may be routed to the apparatus 150 on account of the apparatus 150 being in operative communication with servers deployed at the customer support center. The communication module 158 of the apparatus 150 may receive the call from the caller and forward the call to the processor 152. The processor 152 may identify the helpline number used by the caller as a helpline number reserved for interactions with live agents. More specifically, the call placed by the caller to a reserved helpline number may serve as the signal indicating the caller's wish to speak with the live agent associated with an enterprise. Alternatively, the caller may be connected to an IVR system (IVRS) as part of a predefined call handling procedure. More specifically, the processor 152 may connect the call initiated by the caller to the IVRS deployed at the customer support center. In some scenarios, the assistance provided by the IVRS may be of limited value and the caller may still wish to speak with a live agent and accordingly, the caller may choose an IVRS option to request a voice interaction with the live agent. The choice of the IVRS option by the caller may serve as the signal indicating the caller's wish to speak with the live agent.

In response to a receipt of the signal, the processor 152 may be configured to determine whether at least one live agent from among a plurality of live agents associated with the enterprise is available for a voice interaction with the caller. More specifically, the processor 152 uses initial interaction handling logic stored in the memory 154 and, in conjunction with the registry of live agents stored in the database, determines a suitable live agent for interacting with the caller. Alternatively, a high-level intent may be predicted based on the caller's current and/or past interaction history and a live agent capable of handling callers for the predicted intent may be selected for conducting the interaction with the caller. In some cases, a caller's persona may be predicted based on current and past journeys of the caller on the enterprise interaction channels, and a live agent more suited to a caller's persona type may be selected for conducting the interaction with the caller. The selected live agent may thereafter engage in the interaction with the caller.

However, in some scenarios, no live voice agent may be available for interaction with the caller. More specifically, all live agents may be engaged in interactions with other callers. Due to unavailability of the live agent, the caller may have to endure a lengthy waiting time. To avoid a long waiting time, in at least one embodiment, the processor 152 is configured to divert the caller to an asynchronous messaging channel. The term 'asynchronous messaging channel' as used herein refers to any messaging channel over which the caller can engage in exchanging textual messages with a human messaging agent or an automated/virtual agent and where the conversation is not synchronous (i.e. responses are not instantaneous or real-time) in nature. More specifically, the respective messages from participants are exchanged based on an availability on the participants and are not instantaneous as is the case in a voice call interaction and may involve some delay as in the case of typical text-based interactions. Some non-limiting examples of such messaging channels include Short Message Service (SMS), WhatsApp®, Facebook® messenger, Hike™ messenger, Viber™, and the like. The processor 152 is configured to facilitate a textual messaging-based interaction between a messaging agent and the caller on the asynchronous messaging channel to provide the assistance to the caller. It is noted that a human messaging agent is different than a live agent, who is also a human agent but assigned for conducting voice interactions with calling customers, whereas the human messaging agent is trained for interacting with enterprise customers via an asynchronous textual messaging medium.

Subsequent to the determination that no live agent is available for the voice interaction with the caller, the processor 152 is configured to identify at least one device which is accessible to the caller and which supports the textual messaging-based interaction. In at least one embodiment, the information related to one or more devices associated with the caller may be stored in the database. Such information may have been extracted in relation to previous interactions between the caller and agents of the enterprise or from the information provided by the caller during customer registration process or during previous caller-agent interactions. Accordingly, the processor 152 may identify one or more devices, such as a smart phone, iPad, laptop, PDA, or any other suitable device, which the caller can use for participating in a textual messaging-based interaction. The processor 152 may further be configured to track a presence of the caller and an attention of the caller in one or more enterprise interaction channels. Some non-limiting examples of the enterprise interaction channels may include a Web channel such as for example an enterprise Website, a social media channel, an Email Channel, and the like. In one illustrative example, a Web server associated with the enterprise web site may track online visitors currently accessing the website and extract information such as the visitor's device/IP information, location, etc. In at least one embodiment, the Web server may be configured to provide the tracked information to the apparatus 150 on a real-time basis or provide real-time access to the tracked information. The information may assist in determining whether the caller is present on the website and whether the caller is currently attentive (i.e. whether the caller is also simultaneously accessing web pages of the website) on the Web interaction channel. In another illustrative example, the caller may have logged into a social media account and may currently be active (i.e. either accessing content shared on social media or interacting with other social media users) on the social media account. The apparatus 150 on account of being in operative communication with a Web server hosting the social media portal may receive information related to the presence of the caller on the social media account and whether the caller is currently active on the social media channel or not. The tracking of the presence/attention of the caller in one or more enterprise interaction channels may be used as an input by the processor 152 in determining which electronic devices capable of textual-messaging based interaction are currently accessible to the caller.

In one embodiment, the processor 152 may be configured to perform a prediction in relation to device preferences of the caller. The prediction may be based, at least in part, on stored information related to one or more devices used by the caller for interacting with agents of the enterprise. For example, if the caller in the past several instances of interacting with the enterprise agents has used a smartphone for conducting the interactions, then there is a high likelihood that the caller would prefer to use the smartphone if the caller were to be diverted to the asynchronous messaging channel. Accordingly, the processor 152 may be configured to predict that the device preference of the caller for conducting the textual-messaging based interaction via the asynchronous messaging channel is a smartphone. Alternatively, if the caller in the past several instances of interacting with the enterprise agents has used a tablet device for engaging in chat interactions with the agents, then there is high likelihood that the caller would prefer to use the tablet device if the caller were to be diverted to the asynchronous messaging channel. Accordingly, the processor 152 may be configured to predict that the device preference of the caller for conducting the textual-messaging based interaction via the asynchronous messaging channel is a tablet device. It is noted that the processor 152 may predict one or more device preferences of the caller. The prediction of one or more device preferences of the caller may be used as an input by the processor 152 in determining which electronic devices capable of textual-messaging based interaction are currently accessible to the caller.

In at least one embodiment, in reply to the receipt of the signal and subsequent to the determination that no live agent is available for the voice interaction with the caller, the processor 152 is configured to provide a response to seek permission from the caller to divert the caller to the asynchronous messaging channel. Subsequent to a receipt of the permission from the caller, the caller is diverted to the asynchronous messaging channel on a device, which was identified to be accessible to the caller and which supports the textual messaging-based interaction.

In cases where the caller is connected to an IVRS on calling a helpline number provided by the enterprise and the caller has provided a selection of an IVRS option to indicate the caller's wish to speak with the live agent, the processor 152 may be configured to provide a response to seek the permission of the caller to divert the caller to the asynchronous messaging channel in the form of another IVRS option. The caller may further be requested, by using another IVRS option, to also choose a device for diverting the caller to the asynchronous messaging channel. For example, the processor 152 may be caused to provide a voice prompt informing the caller of the current unavailability of the live agent and further request the caller's permission to divert the caller to an asynchronous messaging channel, so that a messaging agent may provide desired assistance to the caller instead of a live agent. If the caller approves or permits the diversion of the interaction to the asynchronous messaging channel, the processor 152 may cause the IVRS to provide another voice prompt requesting the caller to choose a device from among several device options. In at least one embodiment, the choice of several device options offered to the caller may be generated based on tracking the caller's presence/attention in enterprise interaction channels or based on prediction of device preferences of the caller as explained above. The caller may be diverted to the asynchronous messaging channel on the device chosen by the caller subsequent to the receipt of the choice by the device. For example, if the caller can access any of the connected devices, such as a smart phone, iPad, laptop, PDA, or any other suitable device, then the processor 152 may be configured to seek permission of the caller to divert the call to an asynchronous messaging channel on the accessible device.

It is noted that in some embodiments, the caller may not be connected to the IVRS option subsequent to the caller calling the helpline number associated with the enterprise. For example, the processor 152 may not connect the caller to the IVRS if the IVRS is not available or not suited to conduct the interaction with the caller. In such a scenario, a prompt message may be provided to the caller on either the same device used by the caller for calling the customer support center or on a device accessible to the caller and on which the caller is currently present/active. The prompt message represents the response configured to seek permission from the caller to divert the caller to the asynchronous messaging channel. In at least one embodiment, the prompt message includes an uniform resource locator (URL) capable of triggering the asynchronous messaging channel on the device. In at least one embodiment, a selection input in relation to the URL may be construed as the caller's permission to divert the caller to the asynchronous messaging channel. It is noted that the prompt message may also be provided to the caller in cases, where the caller has provided permission to divert the caller to the asynchronous messaging channel using the IVRS option.

Figure 3:
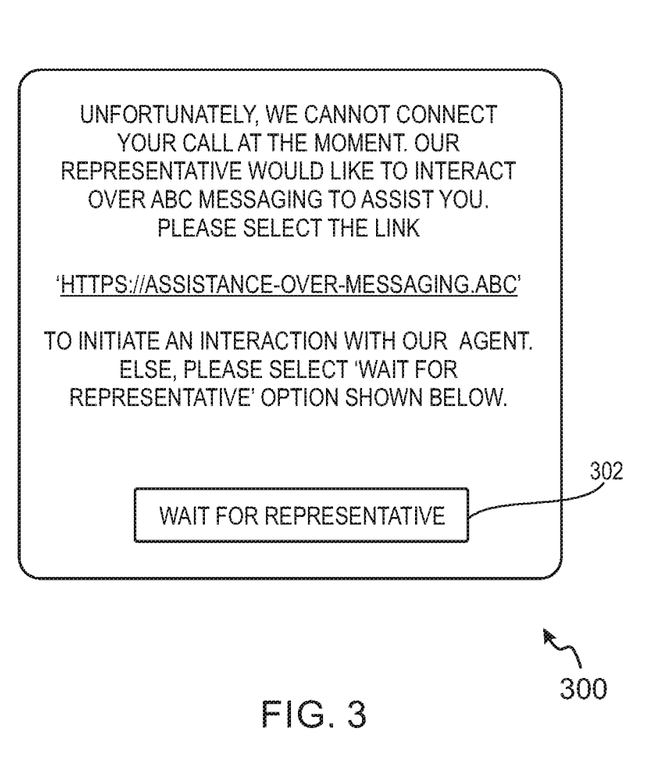
FIG. 3 shows an example representation of a prompt message displayed to a caller, in accordance with an embodiment of the invention.

The selection input in relation to the URL is configured to cause display of a messaging application UI for facilitating the textual messaging-based interaction between the messaging agent and the caller. An example prompt message sent to the caller by the processor 152 to provide assistance to the caller is shown in FIG. 3. The prompt message provided to the caller is displayed as a text-based message in FIG. 3 for illustration purposes.

Referring now to FIG. 3, an example representation of a prompt message 300 displayed to a caller is shown, in accordance with an embodiment of the invention. As explained above, the processor 152 of the apparatus 150 may receive a request for a voice call interaction with a live agent from a caller. The processor 152 is configured to connect the caller to an IVRS if live agents are unavailable for interaction with the caller. If the live agents are unavailable or if the IVRS assistance provided to the caller did not address the caller's concerns adequately, the processor 152 may be caused to divert the caller (i.e. either the initial call from the caller or an ongoing voice interaction with an IVR system) to an asynchronous messaging channel. To divert the caller to the asynchronous messaging channel, the processor 152 may first determine the presence or attention of the caller in another channel/device. For example, if the caller is simultaneously active on social media (i.e. another channel) or on native mobile application (i.e. indicative of the caller being on the mobile phone), the processor 152 may determine that the caller may be able to engage in an asynchronous messaging based interaction over another device/channel. Subsequent to the determination of the ability of the caller to engage in a messaging channel over the same device/different device/different channel, the processor 152 is configured to send a prompt message, such as the prompt message 300, requesting the caller's permission to divert the call to the asynchronous messaging channel.

The prompt message 300 is depicted to be associated with text "UNFORTUNATELY, WE CANNOT CONNECT YOUR CALL AT THE MOMENT. OUR REPRESENTATIVE WOULD LIKE TO INTERACT OVER ABC MESSAGING TO ASSIST YOU. PLEASE SELECT THE LINK 'HTTPS://ASSISTANCE-OVER-MESSAGING.ABC' TO INITIATE AN INTERACTION WITH OUR AGENT. ELSE, PLEASE SELECT 'WAIT FOR REPRESENTATIVE' OPTION SHOWN BELOW".

In one embodiment, the prompt message 300 may be displayed on the electronic device used by the caller to call the helpline number associated with the enterprise. Alternatively, the prompt message 300 may be displayed on the electronic device/channel on which the caller is also active. For example, if the caller called the helpline number using a mobile phone and the caller is also present on a social media channel on the laptop, then the prompt message 300 may be displayed on the mobile phone or in in the messenger associated with the social media channel. The caller may select the link to initiate a text-based interaction with a messaging agent. It is noted that the messaging agent may correspond to a human chat agent or a chatbot specialized in engaging in messaging based interaction with the caller. Alternatively, the caller may select a button 302 associated with text 'WAIT FOR REPRESENTATIVE' to choose to wait for a live agent instead of engaging in a text-based interaction with the agent. If the caller selects the link, then a messaging console UI may be displayed to the caller. An example messaging console UI displayed to the caller is shown in FIG. 4.

Figure 4:
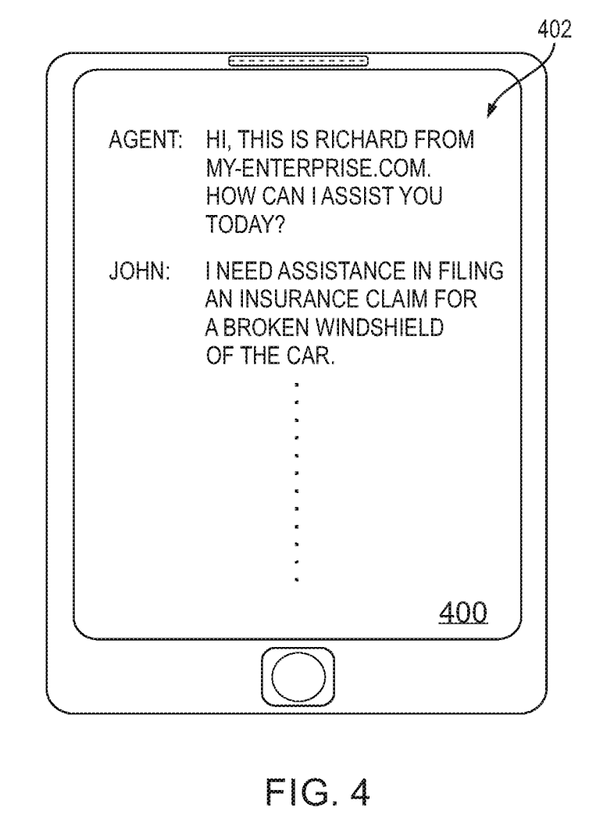
FIG. 4 is a representation of an example messaging application UI displayed to a caller subsequent to the selection of the URL by the caller, in accordance with an example embodiment.

FIG. 4 shows a messaging application UI 400 displayed to a caller subsequent to the selection of the URL by the caller, in accordance with an embodiment of the invention. As explained with reference to FIGS. 2 and 3, the processor 152 may be caused to divert the voice call (i.e. either the initial call from the caller or an ongoing voice interaction with an IVR system) to an asynchronous messaging channel, such as a SMS channel or chat channel, by sending a prompt message, such as the prompt message 300 shown in FIG. 3, requesting the caller's permission to divert the call to the asynchronous messaging channel. The prompt message includes a URL, which when selected by the caller may cause display of a messaging application UI, such as the messaging application UI 400, on a display screen of an electronic device on which the prompt message was displayed.

The messaging application UI 400 is configured to facilitate a text-based interaction 402 between a caller and a messaging agent associated with the enterprise. In one embodiment, the messaging agent may correspond to a human messaging agent, such as a chat agent, specialized in using messages to respond to queries of individuals calling the customer support center. In some embodiments, the agent may correspond to an automated agent (i.e. a chatbot), for example a virtual assistant, trained to respond to queries of the callers and address their concerns.

In FIG. 4, the messaging agent is exemplarily depicted to initiate the text-based interaction 402 with the caller with a statement 'HI, THIS IS RICHARD FROM MY-ENTERPRISE.COM. HOW CAN I ASSIST YOU TODAY?'. The caller may then respond with a query, such as for example, 'I NEED ASSISTANCE IN FILING AN INSURANCE CLAIM FOR A BROKEN WINDSHIELD OF THE CAR'. The text-based interaction 402 may thereafter continue with the messaging agent retrieving the desired information from the transaction database and providing the information to the caller. As the text-based interaction 402 is initiated without the caller having to spend time waiting for the live agent to be available, an interaction experience for the caller is increased manifold and moreover, the desired assistance is provided to the caller in a timely and efficient manner.

In at least some embodiments, if the caller is diverted from the IVR interaction, then a context, such as for example the IVR menu options selected, the IVR menu options not selected when presented to the caller, the sequence of selections, etc., may be captured and used for predicting an intention of the caller for requesting a voice call interaction with the live agent. The intention may be predicted based on caller identification, such as for example, based on the caller's phone number, IP address and such other personal identification information. In an illustrative example, a caller may have previously booked air tickets from an enterprise. Accordingly, the caller's intention for requesting a voice call interaction with the live agent may be predicted to be one of change in the travel itinerary, cancellation of the tickets or a general enquiry related to the timings, baggage policy, or any such matter related to the impending travel.

In some embodiments, the predicted intention may be used to select a messaging agent from among a plurality of human messaging agents and automated agents specialized in providing the assistance to callers using textual messages in relation to the context. For example, in the text-based interaction 402 depicted in FIG. 4, a messaging agent capable of handling queries related to filing of insurance claims for vehicles may be selected for interacting with the caller. Further, the context may be transferred to the messaging agent by the processor 152 (shown in FIG. 2). The transfer of context to the messaging agent may enable the messaging agent to avoid asking questions to the caller for understanding the caller's concerns. In some embodiments, necessary suggestions/recommendations based on the context may also be identified and provided to the agent to enable the agent to bring the messaging interaction to a successful closure.

Figure 5:
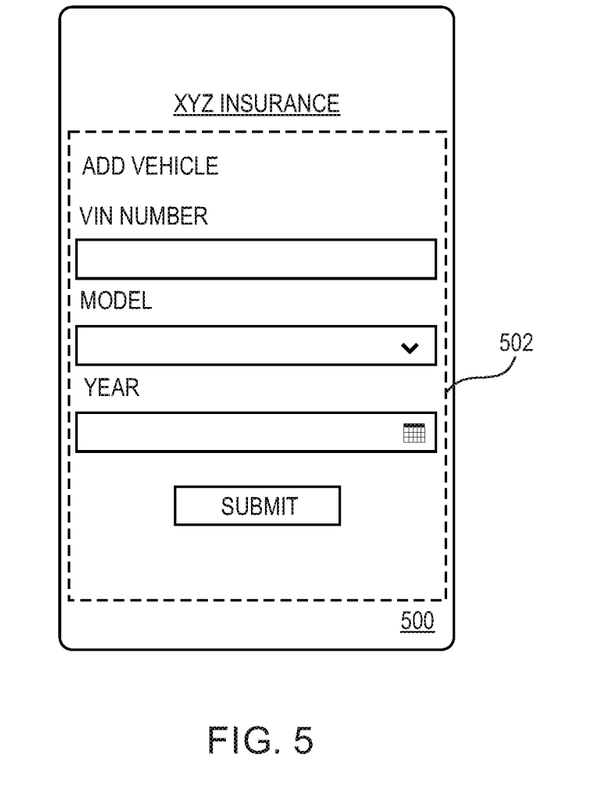
FIG. 5 is a representation of another example UI associated with an asynchronous messaging application, in accordance with an embodiment of the invention.

FIG. 5 is a representation of an example UI 500 associated with an asynchronous messaging application, i.e. a messaging application associated with the asynchronous messaging channel, in accordance with an embodiment of the invention. Some non-limiting examples of the asynchronous messaging application may include an SMS application, an Instant Messenger (IM) application, a chat application, and the like. The UI 500 shown in FIG. 5 corresponds to the UI displayed on the caller's device. In at least one embodiment, the human messaging agent is configured to push content for display during the textual-messaging based interaction with the caller. In some embodiments, content pieces relevant to the interaction may be identified by the apparatus 150 based on the contextual information. The apparatus 150 may provide such content pieces as 'recommended content' to the human messaging agent. The human messaging agent may select appropriate content pieces from among the recommended content and cause display of a content piece during the textual-messaging based interaction. In at least one embodiment, the content to be displayed to the caller may be configured as webpage and overlaid on top of the current screen being viewed by the caller. An example overlaid content is shown as content 502 on the UI 500. The content 502 corresponds to webpage including form fields requesting the caller to enter information related to the car for which the windshield is broken. The human messaging agent may also pre-populate some information on the caller's behalf and in general assist the caller in filing the insurance claim for the broken windshield of the car. Such assistance offered over the asynchronous messaging channel greatly improves a caller's interaction experience and provides the desired assistance in a seamless and effortless manner.

A method for providing assistance to a caller is explained next with reference to FIG. 6.

Figure 6:
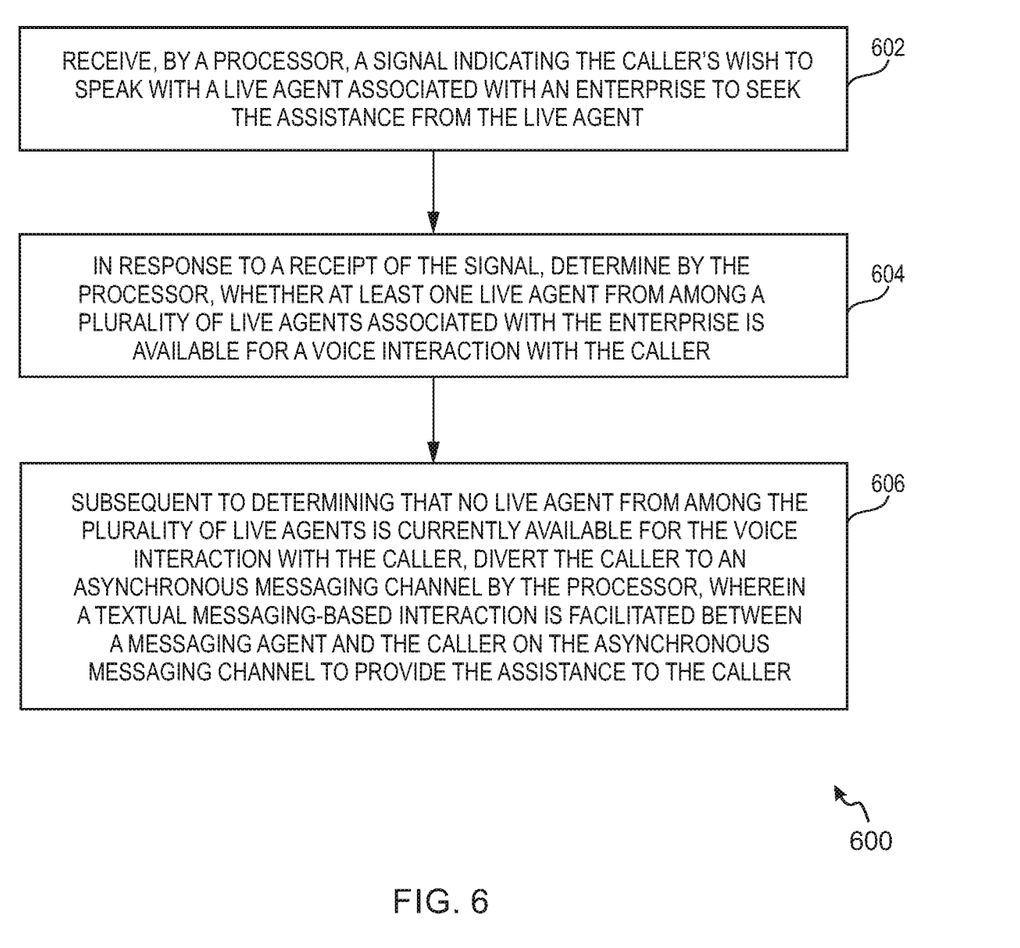
FIG. 6 is a flow diagram of a method for providing assistance to a caller, in accordance with an embodiment of the invention.

FIG. 6 is a flow diagram of a method 600 for providing assistance to a caller, in accordance with an embodiment of the invention. The various steps and/or operations of the flow diagram, and combinations of steps/operations in the flow diagram, may be implemented by, for example, hardware, firmware, a processor, circuitry and/or by an apparatus such as the apparatus 150 explained with reference to FIGS. 1 to 6 and/or by a different device associated with the execution of software that includes one or more computer program instructions. The method 600 starts at operation 602.

At operation 602 of the method 600, a signal indicating the caller's wish to speak with a live agent associated with an enterprise to seek the assistance from the live agent is received by a processor such as the processor 152 explained with reference to FIGS. 2 to 5. For example, the caller may place a call to a helpline number provided by the enterprise to seek assistance from a live agent available at a customer support center of the enterprise. The call may be routed to the processor on account of the processor being in operative communication with servers deployed at the customer support center. The processor may identify the helpline number used by the caller as a helpline number reserved for interactions with live agents. More specifically, the call placed by the caller to a reserved helpline number may serve as the signal indicating the caller's wish to speak with the live agent associated with an enterprise. Alternatively, the caller may be connected to an IVR system (IVRS) as part of a predefined call handling procedure. More specifically, the processor may connect the call initiated by the caller to the IVRS deployed at the customer support center. In some scenarios, the assistance provided by the IVRS may be of limited value and the caller may still wish to speak with a live agent and accordingly, the caller may choose an IVRS option to request a voice interaction with the live agent. The choice of the IVRS option by the caller may serve as the signal indicating the caller's wish to speak with the live agent.

In response to a receipt of the signal, at operation 604 of the method 600, it is determined by the processor whether at least one live agent from among a plurality of live agents associated with the enterprise is available for a voice interaction with the caller. More specifically, the processor uses initial interaction handling logic stored in a memory, such as the memory 154 shown in FIG. 2 and, in conjunction with the registry of live agents stored in a database, determines a suitable live agent for interacting with the caller. Alternatively, a high-level intent may be predicted based on the caller's current and/or past interaction history and a live agent capable of handling callers for the predicted intent may be selected for conducting the interaction with the caller. In some cases, a caller's persona may be predicted based on current and past journeys of the caller on the enterprise interaction channels, and an agent more suited to a caller's persona type may be selected for conducting the interaction with the caller. The selected agent may thereafter engage in the interaction with the caller. However, in some scenarios, no live voice agent may be available for interaction with the caller. More specifically, all live agents may be engaged in interactions with other callers. Due to unavailability of the live agent, the caller may have to endure a lengthy waiting time.

To avoid a long waiting time, at operation 606 of the method 600, the caller is diverted to an asynchronous messaging channel by the processor subsequent to determining that no live agent from among the plurality of live agents is currently available for the voice interaction with the caller. A textual messaging-based interaction is facilitated between a messaging agent and the caller on the asynchronous messaging channel to provide the assistance to the caller. The term 'asynchronous messaging channel' as explained with reference to FIG. 2, implies any messaging channel over which the caller can engage in exchanging textual messages with a human messaging agent or an automated/virtual messaging agent and where the conversation is not synchronous (i.e. responses are not instantaneous or real-time) in nature. More specifically, the respective messages from participants are exchanged based on an availability on the participants and are not instantaneous as is the case in a voice call interaction and may involve some delay as in the case of typical text-based interactions. Some non-limiting examples of such messaging channels include Short Message Service (SMS), WhatsApp®, Facebook® messenger, Hike™ messenger, Viber™, and the like. The processor is configured to facilitate a textual messaging-based interaction between the messaging agent and the caller on the asynchronous messaging channel to provide the assistance to the caller.

In at least some embodiments, subsequent to the determination that no live agent is available for the voice interaction with the caller, the processor is configured to identify at least one device which is accessible to the caller and which supports the textual messaging-based interaction. To this effect, the processor may further be configured to track a presence of the caller and an attention of the caller in one or more enterprise interaction channels. Alternatively, the processor may be configured to perform a prediction in relation to device preferences of the caller. The prediction may be based, at least in part, on stored information related to one or more devices used by the caller for interacting with agents of the enterprise. The information deduced from tracking of the presence/attention of the caller in one or more enterprise interaction channels and/or the prediction of one or more device preferences of the caller may be used as an input by the processor in determining which electronic devices capable of textual-messaging based interaction are currently accessible to the caller.

In at least one embodiment, in reply to the receipt of the signal and subsequent to the determination that no live agent is available for the voice interaction with the caller, the processor is configured to provide a response to seek permission from the caller to divert the caller to the asynchronous messaging channel. Subsequent to a receipt of the permission from the caller, the caller is diverted to the asynchronous messaging channel on a device, which was identified to be accessible to the caller and which supports the textual messaging-based interaction.

In cases where the caller is connected to an IVRS on calling a helpline number provided by the enterprise and the caller has provided a selection of an IVRS option to indicate the caller's wish to speak with the live agent, the processor may be configured to provide a response to seek the permission of the caller to divert the caller to the asynchronous messaging channel in the form of another IVRS option. The caller may further be requested, by using another IVRS option, to also choose a device for diverting the caller to the asynchronous messaging channel. For example, the processor may be caused to provide a voice prompt informing the caller of the current unavailability of the live agent and further request the caller's permission to divert the caller to an asynchronous messaging channel, so that a messaging agent may provide desired assistance to the caller instead of a live agent. If the caller approves or permits the diversion of the interaction to the asynchronous messaging channel, the processor may cause the IVRS to provide another voice prompt requesting the caller to choose a device from several device options. In at least one embodiment, the choice of several device options offered to the caller may be generated based on tracking of the caller's presence/attention in enterprise interaction channels or based on prediction of device preferences of the caller as explained above. The caller may be diverted to the asynchronous messaging channel on the device chosen by the caller subsequent to the receipt of the choice by the device. For example, if the caller can access any of the connected devices, such as a smart phone, iPad, laptop, PDA, or any other suitable device, then the processor may be configured to seek the permission of the caller to divert the call to an asynchronous messaging channel on the accessible device.

It is noted that in some embodiments, the caller may not be connected to the IVRS option subsequent to the caller calling the helpline number associated with the enterprise. For example, the processor may not connect the caller to the IVRS if the IVRS is not available or not suited to conduct the interaction with the caller. In such a scenario, a prompt message, such as the prompt message 300 shown in FIG. 3, may be provided to the caller on either the same device used by the caller for calling the customer support center or on a device accessible to the caller or on which the caller is currently present/active. The prompt message is configured to represent the response configured to seek permission from the caller to divert the caller to the asynchronous messaging channel.

In at least one embodiment, the prompt message may include a uniform resource locator (URL) for triggering the asynchronous messaging channel on the device. In at least one embodiment, a selection input in relation to the URL is configured to cause display of a messaging application UI, such as the messaging application UI 400 shown in FIG. 4, on a display screen of an electronic device on which the prompt message was displayed. The messaging application UI is configured to facilitate a text-based interaction between the caller and a messaging agent associated with the enterprise. An example messaging application UI for facilitating the textual-messaging based interaction on the asynchronous messaging channel is shown in FIGS. 4 and 5 and is not explained again herein.

In at least some embodiments, if the caller is diverted from the IVR interaction, then a context, such as for example the IVR menu options selected, the IVR menu options not selected when presented to the caller, the sequence of selections, etc., may be captured and used for predicting an intention of the caller for requesting a voice call interaction with the live agent. The intention may be predicted based on caller identification, such as for example, based on the caller's phone number, IP address and such other personal identification information. In an illustrative example, a caller may have previously booked air tickets from an enterprise. Accordingly, the caller's intention for requesting a voice call interaction with the live agent may be predicted to be one of change in the travel itinerary, cancellation of the tickets or a general enquiry related to the timings, baggage policy, or any such matter related to the impending travel.

In some embodiments, the predicted intention may be used to select a messaging agent from among a plurality of human messaging agents and automated agents specialized in providing the assistance to callers using textual messages in relation to the context. Further, the context may be transferred to the messaging agent by the processor. The transfer of context to the messaging agent may enable the messaging agent to avoid asking questions to the caller for understanding the caller's concerns. In some embodiments, necessary suggestions/recommendations based on the context may also be identified and provided to the agent to enable the agent to bring the messaging interaction to a successful closure.

Figure 7A:
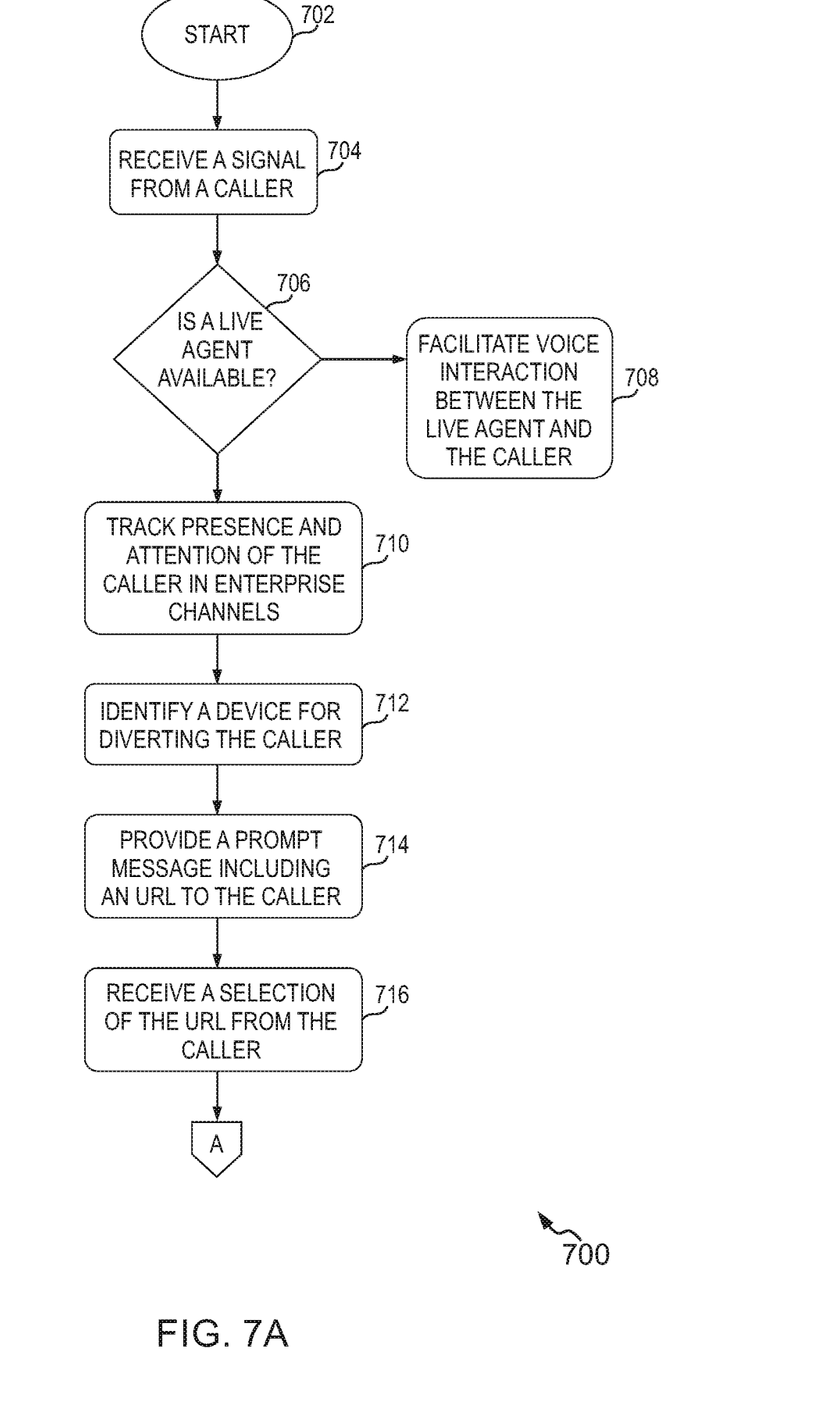
FIGS. 7A-7B show a flow diagram of a method for providing assistance to a caller, in accordance with another embodiment of the invention.
Figure 7B:
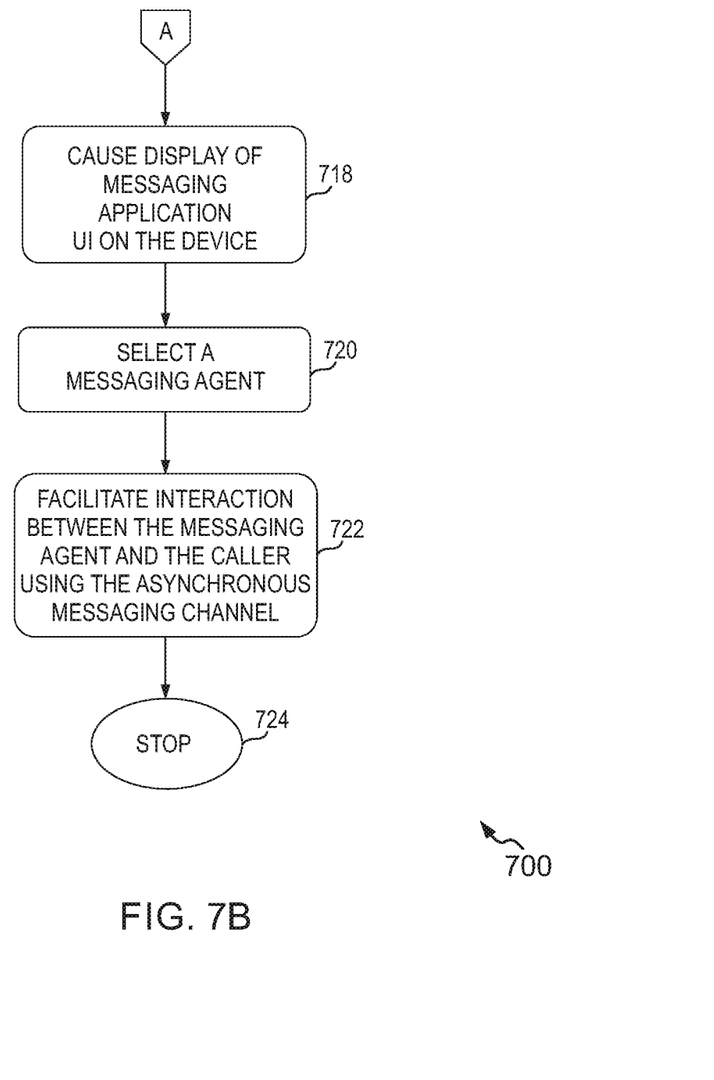

FIGS. 7A-7B show a flow diagram of a method 700 for providing assistance to a caller, in accordance with another embodiment of the invention. The various steps and/or operations of the flow diagram, and combinations of steps/operations in the flow diagram, may be implemented by, for example, hardware, firmware, a processor, circuitry and/or by an apparatus such as the apparatus 150 explained with reference to FIGS. 1 to 6 and/or by a different device associated with the execution of software that includes one or more computer program instructions. The method 700 starts at operation 702.

At operation 704 of the method 700, a signal indicative of a caller's wish to speak with a live agent is received by a processor, such as the processor 152 explained with reference to FIGS. 2 to 5.

At operation 706 of the method 700, it is determined whether a live agent is available for engaging in a voice interaction with the caller. The determination may be performed by the processor. If the live agent is available for the voice interaction, then at operation 708 of the method 700, a voice interaction with the live agent is facilitated. If the live agent is not available for the voice interaction, then operation 710 of the method 700 is performed.

At operation 710 of the method 700, a presence and attention of the caller is tracked in enterprise channels. The tracking of the caller's presence and attention in the enterprise channels may be performed as explained with reference to FIG. 2 and is not explained herein.

At operation 712 of the method 700, a device accessible to the caller and capable of facilitating textual-messaging interaction on an asynchronous messaging channel is identified. The identification of the device may be performed based on the tracking of the presence and/or current attention of the caller in an enterprise channel. Alternatively, the device may be identified based on a prediction of device preferences of the caller in relation to a request for voice call interaction with the live agent.

At operation 714 of the method 700, a prompt message is provided to the caller on the identified device to seek permission of the caller to divert the caller. The prompt message includes the URL capable of triggering a messaging application UI if the caller provides the permission to the divert the caller to the asynchronous messaging channel. It is noted that in some embodiments, the caller may initially be connected to an IVRS and an permission to divert the caller to the asynchronous messaging channel may be provided as an IVRS option to the caller. If the caller permits the diversion, the prompt message including the URL may be displayed on the same device as the current interaction or a different device identified by the processor.

At operation 716 of the method 700, a selection of the URL included in the prompt message is received from the caller.

At operation 718 of the method 700, a messaging application UI is displayed on the device in response to the selection of the URL.

At operation 720 of the method 700, a messaging agent is selected from among a plurality of human messaging agents and a plurality of automated agents based on a context of the interaction. The selection of the messaging agent may be performed as explained with reference to FIGS. 2 to 4 and is not explained again herein.

At operation 722 of the method 700, an interaction is facilitated between the messaging agent and the caller using the asynchronous messaging channel (i.e. using the messaging application UI) to provide assistance to the caller. The method 700 ends at 724.

Various embodiments disclosed herein provide numerous advantages. The techniques disclosed herein suggest techniques for providing assistance to calling customers. The calling customers are diverted to an asynchronous messaging channel when a human voice agent, i.e. a live agent, is not available or when the IVR assistance is of limited help to the caller. Diverting the caller to the asynchronous messaging channel keeps the caller engaged and avoids abandonment of interaction by the caller. As the text-based interaction is initiated without the caller having to spend time waiting for the live agent to be available, an interaction experience for the caller is increased manifold and moreover, the desired assistance is provided to the caller in a timely and efficient manner.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 150 and its various components such as the processor 152, the memory 154, the I/O module 156 and the communication module 158 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 7 and 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for providing assistance to a caller, the method comprising:
   receiving, by a processor, a signal indicating the caller's wish to speak with a live agent associated with an enterprise to seek the assistance from the live agent;
   in response to a receipt of the signal, determining by the processor, whether at least one live agent from among a plurality of live agents associated with the enterprise is available for a voice interaction with the caller;
   predicting, by the processor, an intention of the caller subsequent to the receipt of the signal;
   selecting, by the processor, the messaging agent from among a plurality of human messaging agents and automated agents specialized in providing the assistance to callers using textual messages, the selection of the messaging agent performed, at least in part, based on the prediction of the intention of the caller;
   subsequent to determining that no live agent from among the plurality of live agents is currently available for the voice interaction with the caller, diverting the caller to an asynchronous messaging channel by the processor, wherein a textual messaging-based interaction is facilitated between a messaging agent and the caller on the asynchronous messaging channel to provide the assistance to the caller;
   identifying, by the processor, at least one device which is accessible to the caller and which supports the textual messaging-based interaction, the identification of the at least one device performed subsequent to the determination that no live agent is available for the voice interaction with the caller; and
   tracking, by the processor, at least one of a presence of the caller and an attention of the caller in one or more enterprise interaction channels;
   wherein the at least one device is identified by performing a prediction in relation to device preferences of the caller and, wherein the prediction is based, at least in part, on stored information related to one or more devices used by the caller in the past for interacting with agents of the enterprise.

2. The method of claim 1, further comprising:
   in reply to the receipt of the signal and subsequent to the determination that no live agent is available for the voice interaction with the caller, providing by the processor, a response configured to seek permission from the caller to divert the caller to the asynchronous messaging channel, wherein the caller is diverted to the asynchronous messaging channel on a device from among the identified at least one device subsequent to a receipt of the permission from the caller.

3. The method of claim 2, wherein the caller is connected to an Interactive Voice Response system (IVRS) on calling a helpline number provided by the enterprise and, wherein the signal indicative of the caller's wish to speak with the live agent corresponds to a selection of an IVRS option by the caller.

4. The method of claim 3, wherein the IVRS is further caused by the processor to provide the response to seek the permission of the caller to divert the caller to the asynchronous messaging channel and, wherein the device used for diverting the caller to the asynchronous messaging channel is chosen by the caller using another IVRS option.

5. The method of claim 2, further comprising:
causing, by the processor, display of a prompt message on the device from among the identified at least one device, wherein the prompt message represents the response configured to seek the permission from the caller to divert the caller to the asynchronous messaging channel.

6. The method of claim 5, wherein the prompt message comprises a uniform resource locator (URL) capable of triggering the asynchronous messaging channel on the device, wherein a selection input in relation to the URL is configured to cause display of a messaging application UI for facilitating the textual messaging-based interaction between the messaging agent and the caller.

7. The method of claim 1, further comprising:
facilitating, by the processor, a transfer of context to the messaging agent, the context transferred in relation to the caller's wish to speak with the live agent of the enterprise.

8. An apparatus for providing assistance to a caller, the apparatus comprising:
a memory for storing instructions; and
a processor configured to execute the instructions and thereby cause the apparatus to at least:
receive a signal indicating the caller's wish to speak with a live agent associated with an enterprise to seek the assistance from the live agent;
in response to a receipt of the signal, determine whether at least one live agent from among a plurality of live agents associated with the enterprise is available for a voice interaction with the caller;
predict an intention of the caller subsequent to the receipt of the signal;
select the messaging agent from among a plurality of human messaging agents and automated agents specialized in providing the assistance to callers using textual messages, the selection of the messaging agent performed, at least in part, based on the prediction of the intention of the caller;
subsequent to determining that no live agent from among the plurality of live agents is currently available for the voice interaction with the caller, divert the caller to an asynchronous messaging channel, wherein a textual messaging-based interaction is facilitated between a messaging agent and the caller on the asynchronous messaging channel to provide the assistance to the caller;
identify at least one device which is accessible to the caller and which supports the textual messaging-based interaction, the identification of the at least one device performed subsequent to the determination that no live agent is available for the voice interaction with the caller; and
track at least one of a presence of the caller and an attention of the caller in one or more enterprise interaction channels;
wherein the at least one device is identified by performing a prediction in relation to device preferences of the caller and, wherein the prediction is based, at least in part, on stored information related to one or more devices used by the caller in the past for interacting with agents of the enterprise.

9. The apparatus of claim 8, wherein the apparatus is further caused to:
in reply to the receipt of the signal and subsequent to the determination that no live agent is available for the voice interaction with the caller, provide a response configured to seek permission from the caller to divert the caller to the asynchronous messaging channel, wherein the caller is diverted to the asynchronous messaging channel on a device from among the identified at least one device subsequent to a receipt of the permission from the caller.

10. The apparatus of claim 9, wherein the apparatus is further caused to:
display a prompt message on the device from among the identified at least one device, wherein the prompt message comprises a uniform resource locator (URL) capable of triggering the asynchronous messaging channel on the device and, wherein a selection input in relation to the URL is configured to cause display of a messaging application UI for facilitating the textual messaging-based interaction between the messaging agent and the caller.

11. The apparatus of claim 8, wherein the apparatus is further caused to:
facilitate a transfer of context to the messaging agent, the context transferred in relation to the callers wish to speak with the live agent of the enterprise.

12. A computer-implemented method for providing assistance to a caller, the method comprising:
receiving, by a processor, a signal indicating the caller's wish to speak with a live agent associated with an enterprise to seek the assistance from the live agent;
in response to a receipt of the signal, determining by the processor, whether at least one live agent from among a plurality of live agents associated with the enterprise is available for a voice interaction with the caller;
subsequent to determining that no live agent from among the plurality of live agents is currently available for the voice interaction with the caller, identifying by the processor, at least one device which is accessible to the caller and which supports textual messaging-based interaction;
in reply to the receipt of the signal, providing by the processor, a response configured to seek permission from the caller to divert the caller to an asynchronous messaging channel;
predicting, by the processor, an intention of the caller subsequent to the receipt of the signal;
selecting, by the processor, the messaging agent from among a plurality of human messaging agents and automated agents specialized in providing the assistance to callers using textual messages, the selection of the messaging agent performed, at least in part, based on the prediction of the intention of the caller; and
diverting, by the processor, the caller to the asynchronous messaging channel on a device from among the identified at least one device subsequent to a receipt of the permission from the caller, wherein the textual messaging-based interaction is facilitated between a messaging agent and the caller on the asynchronous messaging channel to provide the assistance to the caller;

identifying, by the processor, at least one device which is accessible to the caller and which supports the textual messaging-based interaction, the identification of the at least one device performed subsequent to the determination that no live agent is available for the voice interaction with the caller; and tracking, by the processor, at least one of a presence of the caller and an attention of the caller in one or more enterprise interaction channels;

wherein the at least one device is identified by performing a prediction in relation to device preferences of the caller and, wherein the prediction is based, at least in part, on stored information related to one or more devices used by the caller in the past for interacting with agents of the enterprise.

13. The method of claim 12, further comprising:

facilitating, by the processor, a transfer of context to the messaging agent, the context transferred in relation to the caller's wish to speak with the live agent of the enterprise.

\* \* \* \* \*